United States Patent [19]
Ogino et al.

[11] Patent Number: 5,804,901
[45] Date of Patent: Sep. 8, 1998

[54] ENERGY CONVERSION DEVICE USING PERMANENT MAGNETS

[76] Inventors: Sanshiro Ogino, 2-20-1, Futaba, Shinagawa-ku, Tokyo; Keiichiro Asaoka, 8-8, Izumi-cho, Atsugi-shi, Kanagawa, both of Japan

[21] Appl. No.: 741,217

[22] Filed: Oct. 29, 1996

[51] Int. Cl.⁶ .......................... H02K 21/00; H02K 41/00; H02K 16/00; H02K 21/12
[52] U.S. Cl. .......................... 310/152; 310/12; 310/114; 310/154; 310/156
[58] Field of Search .......................... 310/12, 152, 154, 310/156, 254, 261, 114

[56] References Cited

U.S. PATENT DOCUMENTS

| | | | |
|---|---|---|---|
| 4,755,703 | 7/1988 | Ueno | 310/184 |
| 4,758,756 | 7/1988 | Pouilange | 310/152 |
| 4,908,533 | 3/1990 | Karita et al. | 310/12 |
| 4,945,268 | 7/1990 | Nihei et al. | 310/12 |
| 5,081,388 | 1/1992 | Chen | 310/266 |
| 5,208,498 | 5/1993 | Hamajima | 310/12 |
| 5,218,250 | 6/1993 | Nakagawa | 310/12 |
| 5,292,284 | 3/1994 | Denk et al. | 464/29 |
| 5,315,190 | 5/1994 | Nasar | 310/12 |
| 5,434,459 | 7/1995 | Pinkerton | 310/20 |
| 5,528,090 | 6/1996 | Satomi | 310/12 |
| 5,552,653 | 9/1996 | Nose | 310/263 |
| 5,554,903 | 9/1996 | Takara | 310/266 |

*Primary Examiner*—Steven L. Stephan
*Assistant Examiner*—Michael J. Wallace, Jr.
*Attorney, Agent, or Firm*—Oblon, Spivak, McClelland, Maier & Neustadt, P.C.

[57] ABSTRACT

An energy-conversion device using permanent magnets in which there is 1) an attraction magnetic field generating device constituted by connecting the two poles between an electromagnet made by wrapping exciting coils around magnetic yokes and permanent magnets parallelly installed with the electromagnets and 2) magnetic attracted blocks supported parallelly to the said attraction magnetic field generating device and in which poles in the same direction as or in the opposite direction to the permanent magnets are produced by pressing the said exciting coils with positive or negative direct current, accordingly causing the said attracted blocks to be attracted or released and thereby converting electric energy to kinetic energy.

10 Claims, 11 Drawing Sheets

ENERGY CONVERSION DEVICE USING PERMANENT MAGNETS

1. CROSS REFERENCES TO RELATED APPLICATION (IF ANY)

Linear motor and rotary motor using the principle of a energy conversion device using permanent magnets.

2. BACKGROUND OF THE INVENTION

Field of the Invention

The present invention concerns an energy conversion device using permanent magnets capable of generation of a linear magnetic field or rotational magnetic field and output of linear driving force or rotational driving force. It is technology classified in International Patent Category H02K 1/00, 3/00, 21/00.

Prior Art

In the conventionally alternating-current motor or alternating-current induction motor an exciting coil installed at the pole of the stator is impressed with alternating voltage with the necessary phase difference to generate an exciting current and a rotational magnetic field with which the rotor is made to rotate in synchronized fashion.

Similarly, in the case of the linear motor, a number of exciting coils arranged in linear fashion are impressed with alternating voltage with the prescribed phase difference to generate exciting current and form a linear magnetic field that applies driving force to a magnetic movable object.

In other words, the driving magnetic field generating mechanism used in the conventional rotary motor, linear motor, etc. to generate a rotational magnetic field or linear magnetic field has a structure that generates a driving magnetic field in the necessary direction by supplying exciting current with staggered phase to a number of exciting coils.

Thus, since the rotary motor, linear motor and other energy conversion devices using the conventional driving magnetic field generating mechanism set the rotation speed or displacement speed by means of the phase difference of the driving magnetic field, they are dependent on the frequency of the alternating current and, with the exception of the coil induction motor and some other motors, it is difficult to set the speed of rotation at any desired value, and therefore it is generally necessary to use an inverter to control the speed of rotation. That gives rise to the problem of interference caused nearby control equipment by the high frequencies generated by the inverter.

Furthermore, since in the conventional energy conversion devices the kinetic energy in the form of rotational force or linear driving force is proportional to the electric current with which they are impressed, that necessitates a power capacity that corresponds to the necessary torque, which in turn makes for poor energy efficiency and hence the need for improvement.

3. BRIEF SUMMARY OF THE INVENTION

(Purpose of the Invention)

The present invention has been made in consideration of the above problems. It is for the purpose of providing an energy conversion device using permanent magnets that is capable of improving energy efficiency and that, moreover, does not affect other control equipment.

(Means of Resolving the Problem)

The essence of the energy conversion device using permanent magnets which the present invention concerns is that it converts electric energy to kinetic energy in the following manner: An electromagnet is formed by wrapping an exciting coil around a magnetic yoke, and an attraction magnetic field generating mechanism is formed by connecting that electromagnet with a parallelly installed permanent magnet by both poles. The magnetic attracted block is held parallel to both poles of that attraction magnetic field generating mechanism. The exciting coil is impressed with positive or negative direct voltage, generating a pole in the same direction as, or different direction from, the parallelly installed permanent magnet, which causes the attracted block to be attracted or released, thereby converting electric energy to kinetic energy.

Furthermore, a linear motor is constituted by arranging a number of the above-mentioned attraction magnetic field generating mechanisms in linear fashion, supporting a movable body equipped with a number of the above-mentioned attracted blocks in freely displaceable fashion opposite to the attraction magnetic field generating mechanisms in the direction of its arrangement, impressing the exciting coils of each of the attraction magnetic field generating mechanisms with staggered-phase control current and causing the movable body to be displaced linearly in the intended direction.

Again, a rotary motor is constituted by installing a number of the above-mentioned attraction magnetic field generating devices in circumferential fashion, axially supporting a rotatable body equipped peripherally with a number of the above-mentioned attracted blocks opposite to the axial centers of the attraction magnetic field generating mechanisms in freely rotatable manner, impressing the exciting coils of the attraction magnetic field generating mechanisms with staggered-phase control current and causing the movable body to rotate in the intended direction.

The essence of another energy conversion device using permanent magnets that the present invention concerns is as follows. A pair of electromagnets is made by wrapping an exciting coil around each of two bracket-shaped yokes serving as magnetic bodies, and the two electromagnets are faced opposite to each other. The two poles of permanent magnets are put in contact between the ends of the two yokes of the two electromagnets to form an attraction magnetic field generating mechanism that is a closed magnetic circuit, and the magnetic attracted block is supported parallelly to the two poles in correspondence to the two permanent magnets of the said attraction magnetic field generating mechanism. Electric energy is converted to kinetic energy by impressing the above-mentioned exciting coils with positive or negative direct voltage, generating poles in the same direction as, or different direction from, the parallelly installed permanent magnets and having the attracted block attracted or released.

Specifically, a number of such attraction magnetic field generating mechanisms are arranged circumferentially, and a rotating body consisting of a number of such multiple pair attracted blocks arranged on the inside perimeter and on the outside perimeter are supported in opposite and freely rotating manner in concentric axial position with the attraction magnetic field generating mechanisms. A rotary motor is constituted by impressing the exciting coils of all of the attraction magnetic field generating mechanisms with phase-staggered control current and causing the above-mentioned moving body to be displaced rotationally in the intended direction.

Again, a linear motor is constituted by arranging a number of the above-mentioned attraction magnetic field generating mechanisms in linear fashion, supporting a number of the above-mentioned multiple pair attracted blocks in opposite fashion in the direction of arrangement of the attraction magnetic field generating mechanisms for relatively free displacement, impressing the exciting coils of all of the attraction magnetic field generating mechanisms with staggered-phase control current and causing linear displacement of the above-mentioned moving body in the intended direction.

(Effect)

According to the above configuration, linear or rotational force is generated by attracting the magnetic attracted blocks to, or releasing them from, the attraction magnetic field generating mechanisms equipped with electromagnets created by contact of the poles parallelly with the permanent magnets. Because of that, when the electromagnet is impressed with current in such a way as to have poles with the same direction as the permanent magnet, the attracted block is attracted with a magnetic force that is the sum of the magnetic-force of the permanent magnet and the magnetic force of the electromagnet, making it possible to obtain considerable output.

In other words, by using permanent magnets as well, high output can be obtained, and energy efficiency can be improved.

Furthermore, the present invention is characterized by the fact that it is possible to constitute large-output motors since with the energy conversion device using permanent magnets which it concerns, it is simple to install the attraction magnetic field generating mechanisms in series or in parallel in multiple tiers.

Furthermore, other features of the energy conversion device using permanent magnets that the present invention concerns include (1) improvement of energy efficiency because of the fact that heat generation is extremely small and there is hardly any heat loss in spite of the large output that can be obtained by use of permanent magnets as well and (2) no adverse effect on other control equipment.

The other characteristics and advantages of the present invention that are not mentioned above will be made evident in the explanation below making reference to the annexed drawings.

BRIEF DESCRIPTION OF THE DRAWINGS

In FIG. 4 (a), (b) and (c) are explanatory sketches indicated the operating principle of the same linear motor.

DETAILED DESCRIPTION OF THE PREFERRED EMBODIMENTS

[Embodiment 1]

FIG. 1 to FIG. 5 show the embodiment consisting of a linear motor using linear magnetic field generating mechanisms.

Figure 1:
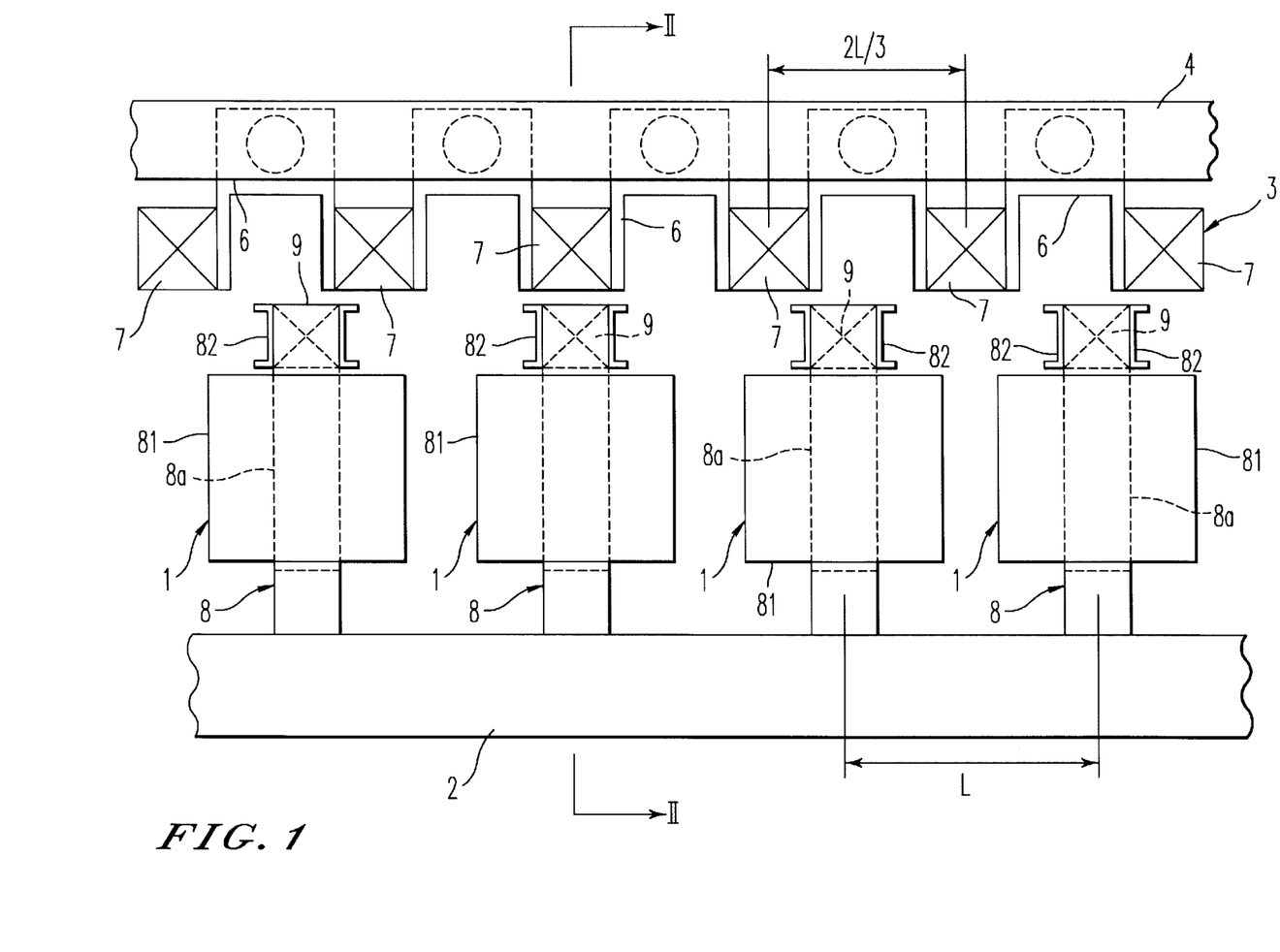
FIG. 1 is a schematic front view of a linear motor as the first embodiment of an energy conversion device using permanent magnets as per the present invention.

The numbers starting with 1 (11, 12, 13, . . . ) represent attraction magnetic field generating mechanisms using permanent magnets. The linear motor is formed by fixing a number of attraction magnetic field devices 11, 12, 13, . . . at equal intervals L to the nonmagnetic frame 2 in linear fashion. Above the frame 2 the support rail 4 supporting the moving body 3 is installed transversely in the direction of extension of the attraction magnetic field generating mechanisms 11, 12, 13, . . . The configuration is one in which the magnetic attracted blocks 7 (71, 72, 73, . . . ) are arranged at intervals of ⅔ L (i.e. two-thirds of the above-mentioned interval L of the attraction magnetic field devices) on the nonmagnetic support bracket 6 that is supported by the support rail 4 so as to move freely in sliding manner in the direction of the latter and move is proximity to the attraction magnetic field device 1.

Figure 2:
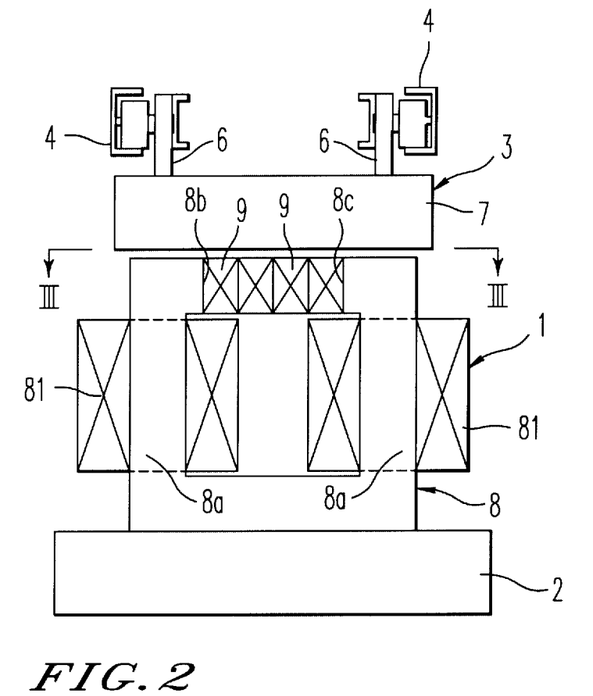
FIG. 2 is a sectional view of FIG. 1 according to line II—II.
Figure 3:
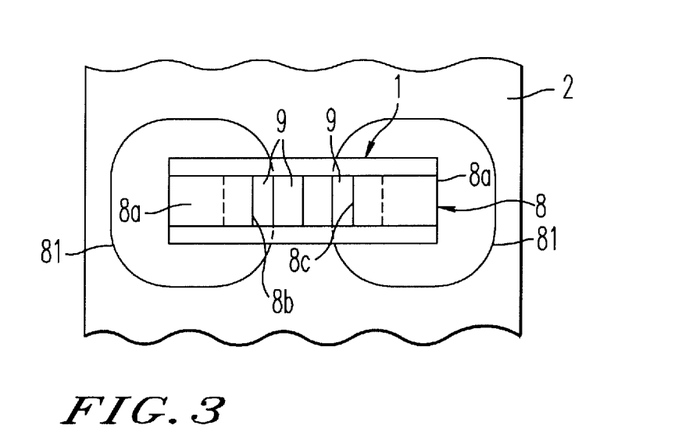
FIG. 3 is a sectional view of FIG. 2 according to line III—III.

As indicated in FIG. 2, the structure of the above-mentioned attraction magnetic field devices 1 is formed by wrapping exciting coils 81, 81 around the columnar parts 8a, 8a of yoke 8 made of piled up soft magnetic permalloy plates with an aperture in the middle of the upper side and a square shape and by tightly inserting permanent magnet 9 between aperture ends 8b, 8c. 82 is a magnet fixing bracket for fixing the said permanent magnet 9 and consists of brass or other nonmagnetic material. One or more (in the embodiment 4 permanent magnets 9 are used in straight-line fashion) permanent magnets 9 are installed in inserted fashion at aperture ends 8b, 8c of yoke 8 to make a single body and form a closed magnetic circuit.

Figure 5:
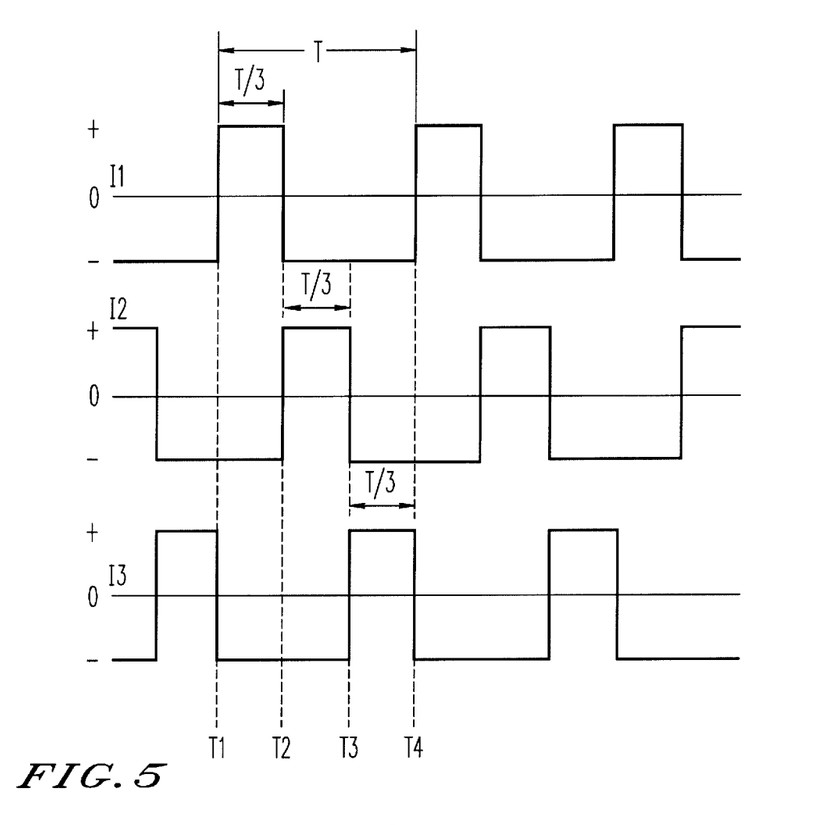
FIG. 5 is a timing chart of the current with which the same attraction magnetic field device is impressed.

The above-mentioned yoke 8 is constituted as indicated in FIG. 5 by controlling exciting coil 81 by impression with direct voltage and by forming a magnetic field with the same direction as, or opposite direction to, the permanent magnet 9.

Furthermore, the above-mentioned attracted block 7 is installed transversely in such a way as to be near and parallel to aperture ends 8b, 8c of the said yoke 8 and is attracted by the magnetic force of attraction magnetic field device 1, with sliding displacement along support rail 4.

When exciting coil 81 is impressed with current in such a way that a pole with the same direction as permanent magnet 9 appears at aperture ends 8b, 8c of the yoke 8, a magnetic field consisting of the total along with the pole of permanent magnet 9 occurs at the said aperture ends 8b, 8c ("ON" state), and the above-mentioned attraction magnetic field devices 1 powerfully attract the attracted block 7.

Furthermore, when exciting coil 81 is impressed with current in such a way that a pole with a direction opposite to that of permanent magnetic 9 appears at aperture ends 8b, 8c of the yoke, a magnetic field consisting of the difference with the pole of permanent magnet 9 occurs at the said aperture ends 8b, 8c. By controlling the impressed current, the two magnetic fields are made to offset one another, and the attraction force on attracted block 7 is cancelled ("OFF" state).

Figure 4A:
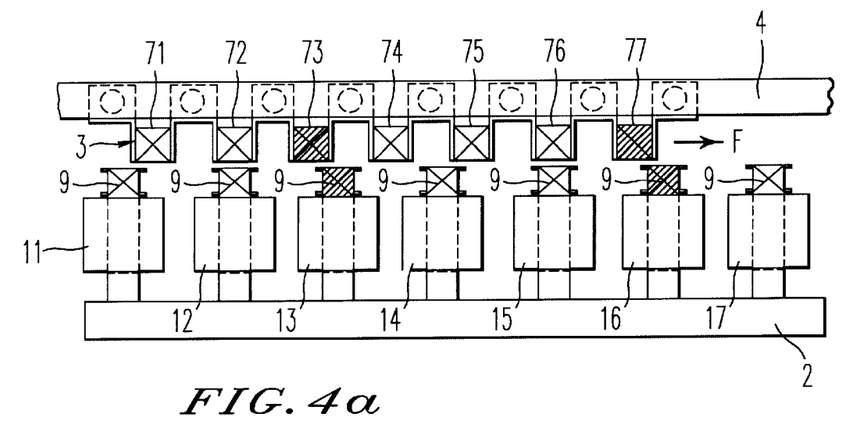
Figure 4B:
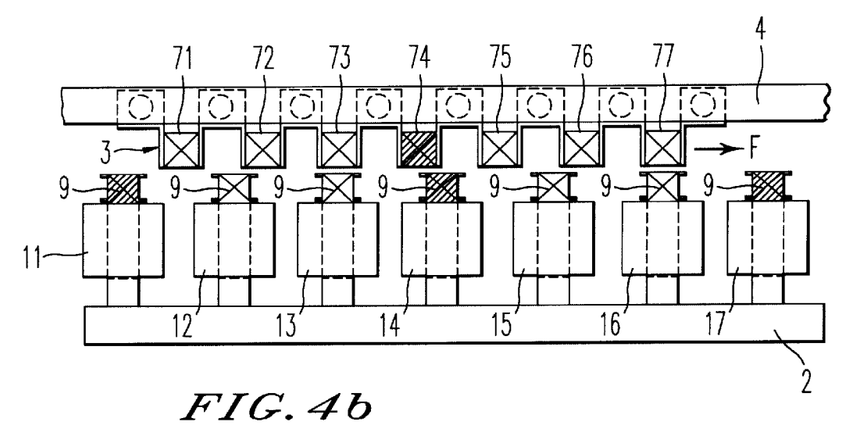
Figure 4C:
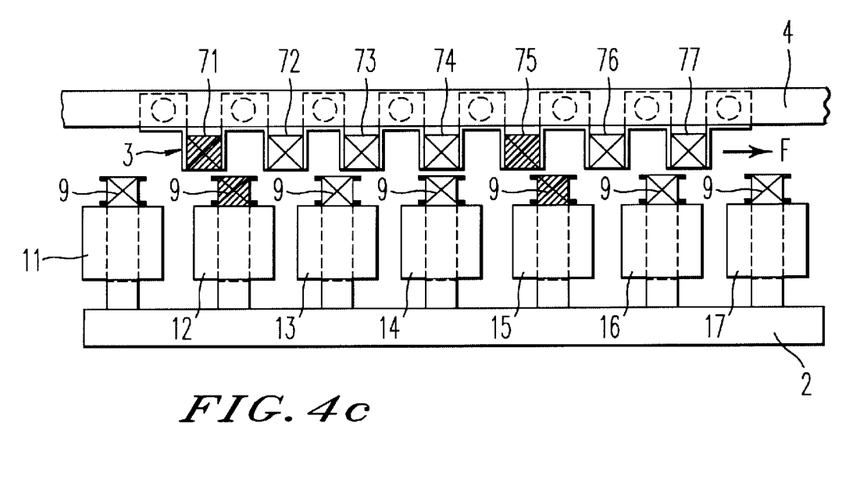

The linear motor with the above configuration generates a linear magnetic field as indicated in FIG. 4 and FIG. 5.

As indicated in FIG. 5, exciting coil 81 of the multiply arranged attraction magnetic field devices 11, 12, 13, and so on is impressed in cyclic fashion by a first exciting current I1, a second exciting current I2, a third exciting current I3, and so on in the order of the parallel arrangement. When an opposite-direction (negative) current is controlled to a magnitude such that the magnetic fields of the opposite-direction pole that occurs at aperture ends 8b, 8c of yoke 8 and the pole of permanent magnet 9 are offset, moving body 3 undergoes linear displacement as indicated in FIG. 4 (a), (b) and (c).

For instance, in FIG. 4 (a), in which a first exciting current I1 shown in FIG. 5 is impressed, attraction magnetic field devices 13 and 16 are in the "ON" state, and the other attraction magnetic field devices are in the "OFF" state, attracting attracted blocks 73 and 77, indicated in the figure by hatching, and therefore causing moving body 3 to be displaced in the direction F indicated by the arrow.

If a second exciting current I2 is impressed after T/3 in the above timing, as indicated in FIG. 4 (b), attraction magnetic field devices 14 and 17 go to the "ON" state, and the other attraction magnetic field devices go to the "OFF" state, causing attraction of attracted block 74, indicated in the figure by hatching, and, as is to be expected, displacement of moving body 3 in the direction F indicated by the arrow.

If a third exciting current I3 is impressed after another T/3 in the above timing, as indicated in FIG. 4 (c), attraction magnetic field devices 12 and 15 go to the "ON" state, and the other attraction magnetic field devices go to the "OFF" state, causing attracted blocks 71 and 75, indicated in the figure by hatching, to be attracted and moving body 3, as expected, to be displaced in the direction F indicated by the arrow.

As a result, moving body 3 becomes a propelled body that undergoes continuous displacement in the direction F indicated by the arrow.

[Embodiment 2]

Figure 6:
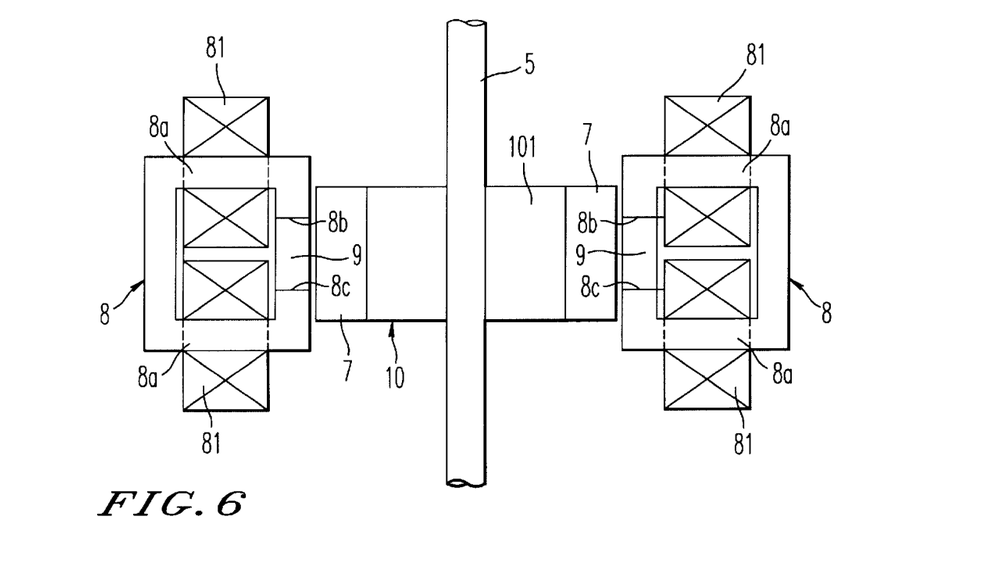
FIG. 6 is a diagram indicating the principle of a rotary motor given as the second embodiment of an energy conversion device using permanent magnets as per the present invention.
Figure 7:
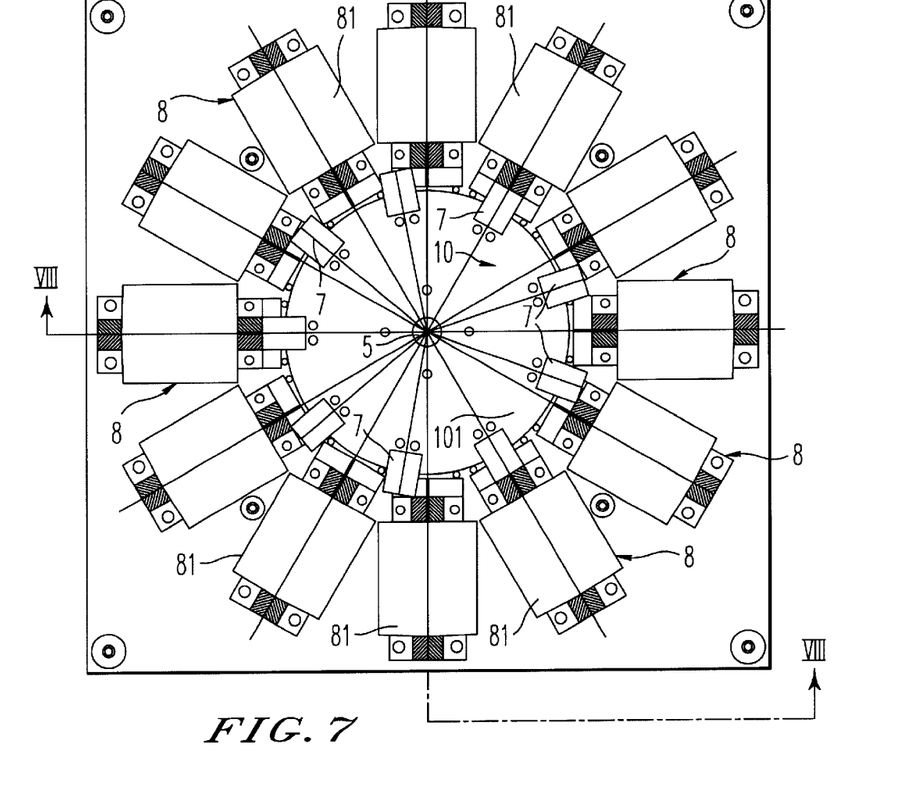
FIG. 7 is a plan view, with the side plate removed, of an embodiment consisting of a rotary motor with 12 attraction magnetic field devices arranged on the periphery of the rotor.
Figure 8:
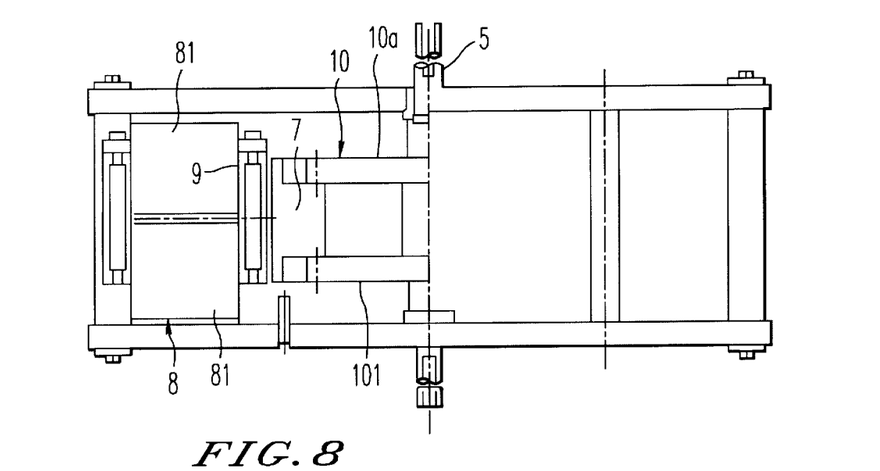
FIG. 8 is a sectional view of FIG. 7 according to line IIX—IIX.

FIG. 6 to FIG. 8 indicate an embodiment of the invention in the form of a rotary motor using rotating magnetic field generating mechanisms.

As indicated in FIG. 6, a diagram showing the principle, with the same numbering as in the above embodiment, this rotary motor is constituted by arranging a number of attraction magnetic field generating mechanisms 1 around a rotating axis 5 at equal distances and with equal angles and replacing moving body 3 by rotor 10 at the rotating axis.

In other words, attraction magnetic field device 1 constitutes yoke 8 by means of a square-shaped soft magnetic material with an aperture at the middle of the lateral side of the rotating axis, and a closed magnetic circuit is formed by wrapping exciting coils 81, 81 respectively around columnar parts 8a, 8a and tightly inserting permanent magnet 9 between aperture ends 8b, 8c.

Furthermore, the structure of the said rotor 10 is that of fixed installation of a number of attracted blocks 7 on the perimeter of nonmagnetic holding plate 10a axially attached to rotating axis 5, and the said attracted blocks 7 are installed parallel to rotating axis 5 in such a way as to be close to and parallel to aperture ends 8b, 8c of yoke 8.

When exciting coil 81 is impressed with current in such a way that a pole with the same direction as that of permanent magnet 9 occurs at aperture ends 8b, 8c of yoke 8, a magnetic field representing the total together with the pole of permanent magnet 9 occurs at the said aperture ends 8b, 8c ("ON" state), and the said attraction magnetic field devices 1 strongly attract attracted blocks 7.

Again, if exciting coil 81 is impressed with current in such a way that a pole with a direction opposite to that of permanent magnet 9 appears at aperture ends 8b, 8c of yoke 8, a magnetic field representing the difference with the pole of permanent magnet 9 occurs at the said aperture ends 8b, 8c, and by controlling the impressed current, the two magnetic fields are offset, and the attraction force on attracted block 7 is cancelled ("OFF" state).

Attracted block 7 is attracted and undergoes rotational displacement as a result of occurrence and cancellation of magnetic force according to the "ON" and "OFF" states of the attraction magnetic field devices 1, and rotational output is obtained from rotating axis 5.

FIG. 7 and FIG. 8 show an embodiment with a structure in which 12 attraction magnetic field generating mechanisms 1 are arranged in the circumferential direction and 9 attracted blocks 7 are arranged on the perimeter of rotor 10. The attraction magnetic field generating mechanisms 1 constituting the said rotary motor impress 12 exciting coils 81 in 3 sets (4 in each set) with current, each with ¼ cycle phase lag, so that yoke 8 is actuated to the "ON" state, the attracted blocks 7 being successively attracted in the direction of rotation and undergoing rotational displacement, and rotation output being obtained from rotating axis 5.

[Embodiment 3]

Figure 9:
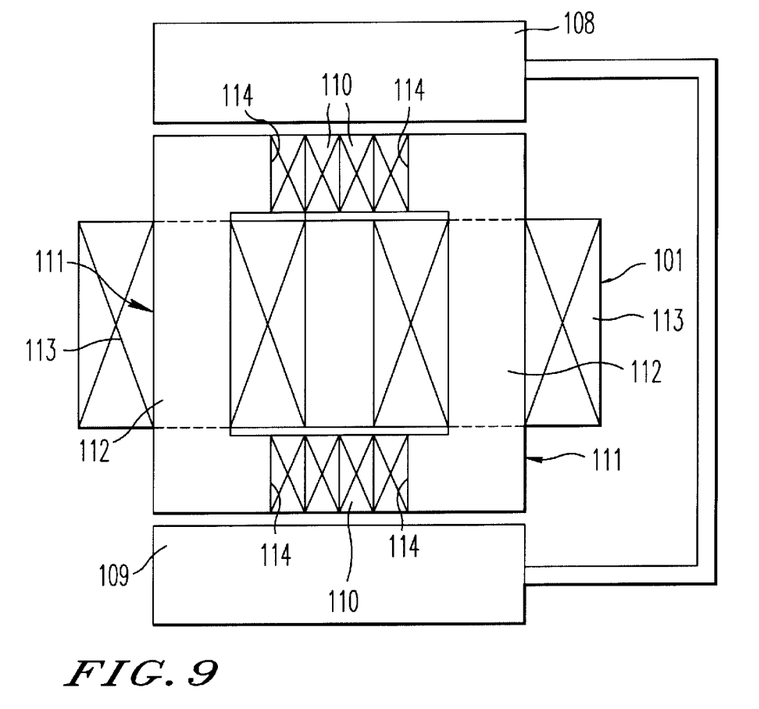
FIG. 9 is a schematic front view indicating the principle of a energy conversion device using permanent magnets as per the present invention.
Figure 10:
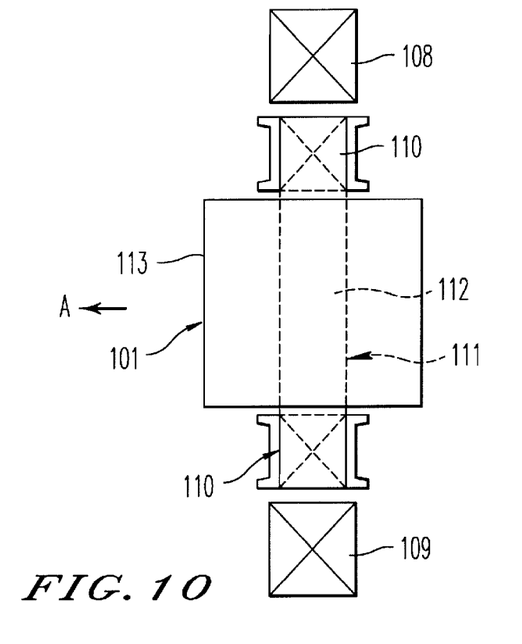
FIG. 10 is a side view of the same.

FIG. 9 and FIG. 10 explain the principle of other forms of embodiment of the energy converting device using permanent magnets as per the present invention.

Number 101 indicates the attraction magnetic field generating mechanism. A pair of bracket-shaped yokes 111, 111 consisting of piled soft magnetic plate material such as permalloy are placed opposite to one another, exciting coils 113, 113 are wrapped respectively around the columnar parts 112, 112 thereof, and permanent magnets 110, 110 are respectively tightly inserted between the ends 114, 114 of the pair opposing one another to form closed magnetic circuits with magnetic fields in the same direction.

In that case the said exciting coils 113, 113 are wound in the same direction as the closed magnetic circuits, and the current with which exciting coils 113, 113 are impressed is connected in such a way as to form magnetic fields with the opposite direction to that of the magnetic fields of permanent magnets 110, 110.

Number 108 indicates an attracted block made of magnetic soft iron or other similar material. The structure is such that it is close to one of the two permanent magnets 110 of the attraction magnetic field generating mechanism 1 and undergoes relative position displacement in direction indicated by the arrow A.

Furthermore, number 109 also indicates an attracted block made of magnetic soft iron or other similar material. It is mechanically unified with the above-mentioned attracted block 108 so as to have a structure in which it is close to the other permanent magnet 110 of the above-mentioned attraction magnetic field generating mechanism 101 and undergoes relative position displacement in direction indicated by the arrow A.

In the above-mentioned attraction magnetic field generating mechanism 1, when the two exciting coils 113, 113 are impressed with current in such a way that poles identical to permanent magnets 110, 110 appear at the opposing ends 114, 114 of yokes 111, 111, a magnetic field representing the total together with the flux density in the poles of permanent magnets 110, 110 occurs at ends 114, 114 opposing attracted block 108 and attracted block 109 ("ON" state), and the two attracted blocks 108, 109 are strongly attracted.

Furthermore, if the current with which exciting coils 113, 113 of yokes 111, 111 were impressed is cut off, the magnetic circuit including the two permanent magnets 110, 110 is closed, the magnetic field that occurred between ends 114, 114 of yokes 111, 111 is cancelled, and the attraction force on attracted blocks 108, 109 is lost ("OFF" state).

The two attracted blocks 108, 109 opposite to one another on the two sides of the attraction magnetic field generating mechanism 1 are attracted or released according to whether the magnetic force occurs or is lost depending on the "ON" or "OFF" state of the attraction magnetic field generating mechanism 1, and by controlling the timing of such effect, it is possible to constitute an energy converting device with output of rotational force or propulsion force.

[Embodiment 4]

Figure 11:
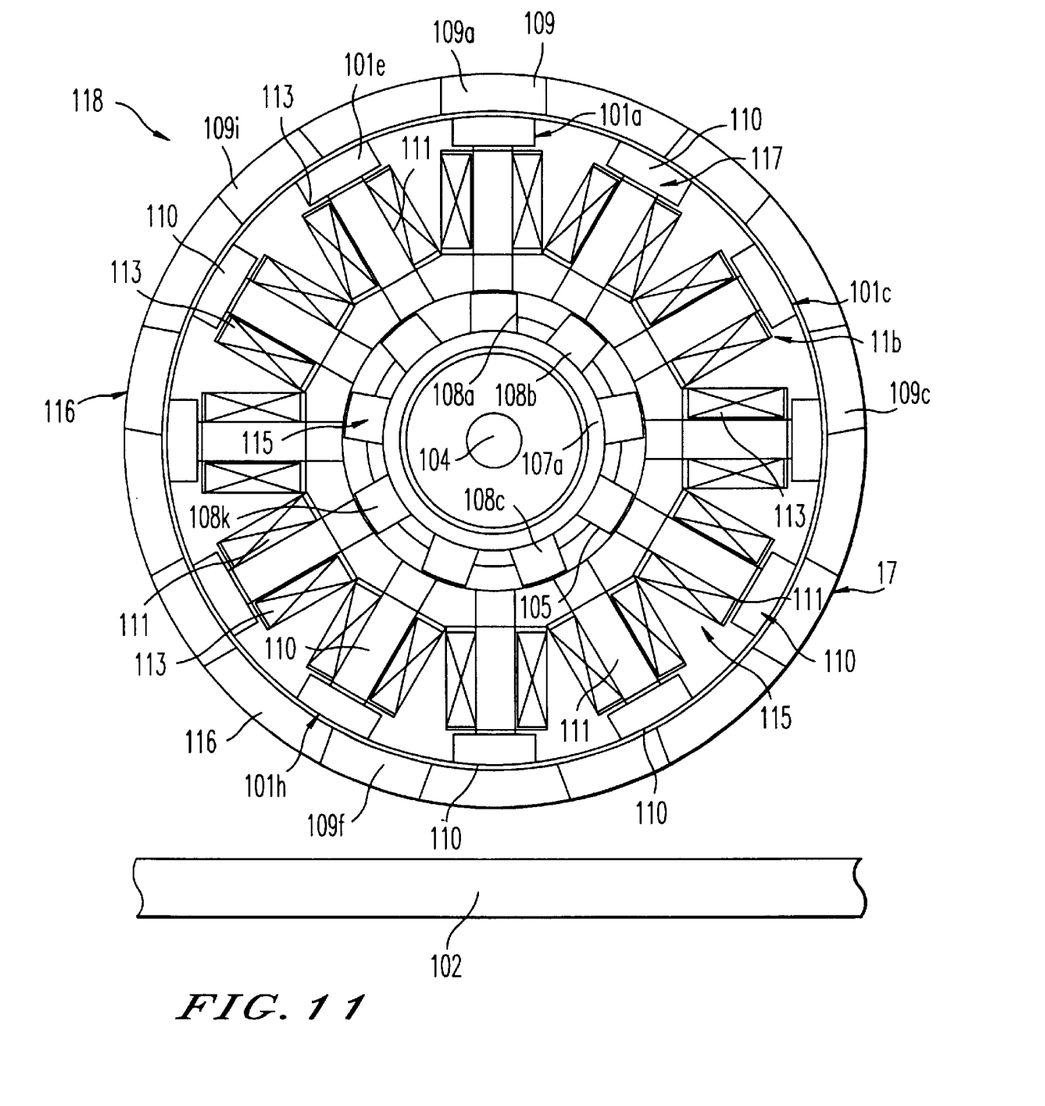
FIG. 11 is a partial cutaway front view of a rotary motor as the first embodiment of an energy conversion device using permanent magnets as per the present invention.
Figure 12:
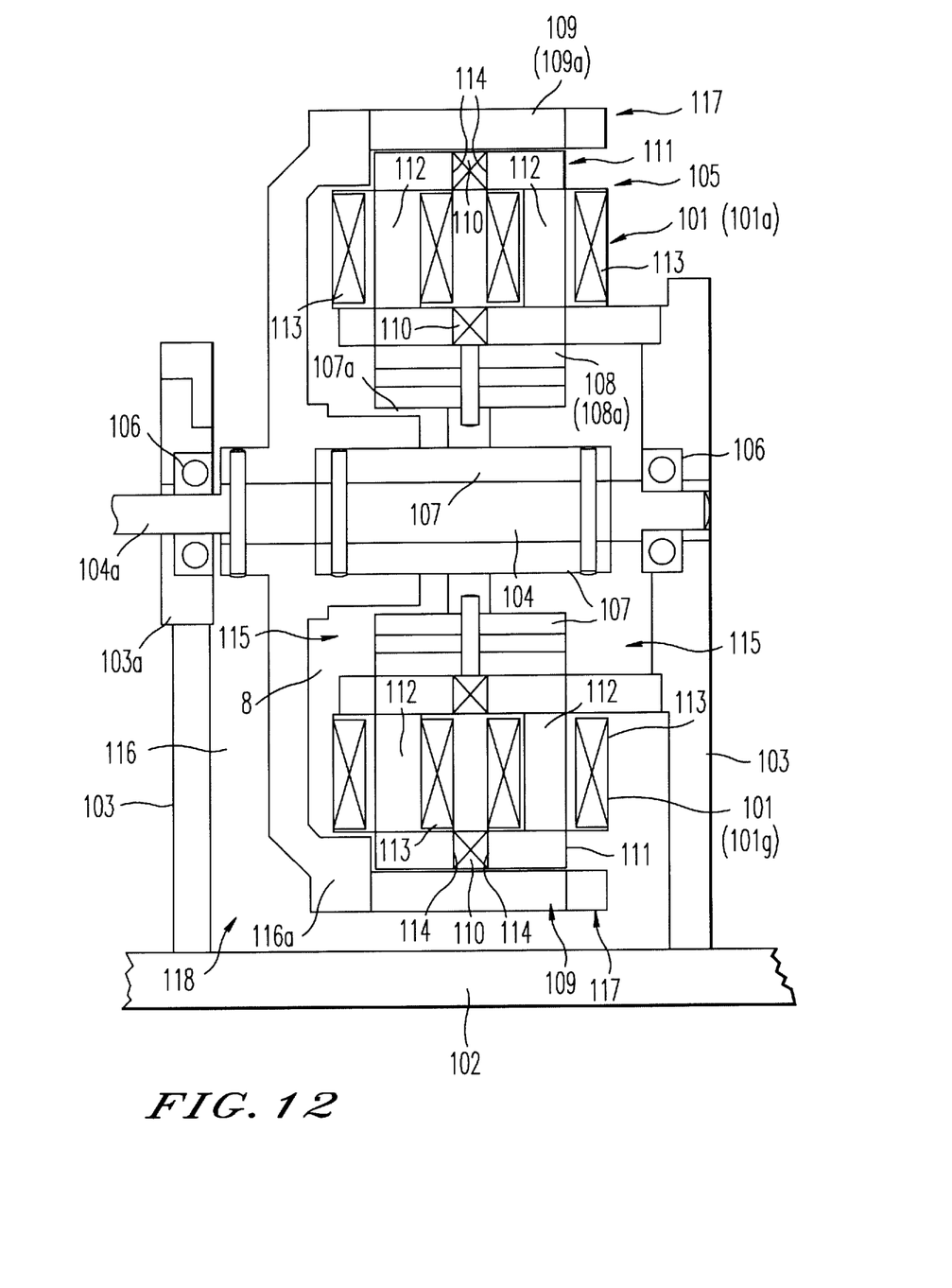
FIG. 12 is a longitudinal section of the same.
Figure 13:
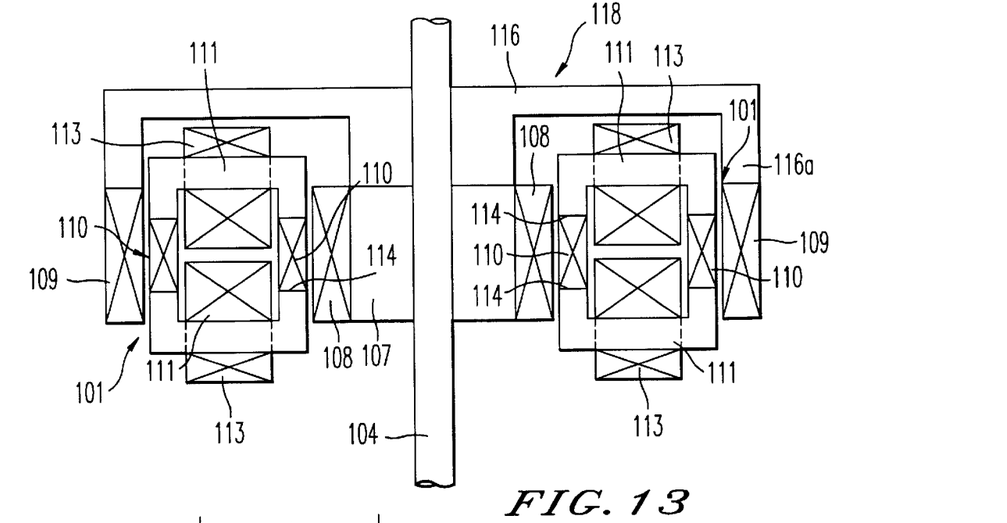
FIG. 13 is a conceptual diagram of the same attraction magnetic field generating device.

FIG. 11 to FIG. 13 show a rotary motor using rotational magnetic field generating mechanisms as an embodiment of the energy converting device as per the present invention.

In that rotary motor, a number of (12 in the figure) attraction magnetic field generating mechanisms 101 (101*a*, 101*b*, 101*c*, etc.) are concentrically arranged and affixed on the end plate 103 of a basket 102 made of aluminum or other nonmagnetic material on the perimeter of the rotating axis 104 at equal intervals and equal angles to form the stator 105.

Furthermore, the said rotating axis 104 has freely turning axial attachment installation by means of rotational ball bearings 106, 106 between the opposing end plates 103, 103 and protrusion of an end outside end plate 103 as output axis 104*a*. The number 103*a* indicates a bearing cap.

Each of the above attraction magnetic field generating mechanisms 101 (101*a*, 10*b*, 10*c*, etc.) has opposing yokes 111, 111 with a bracket shape and consisting of a pile of plates of permalloy or other soft magnetic material, and a closed magnetic circuit with magnetic fields of the same direction is formed by wrapping exciting coils 113, 113 around the respective columnar parts 112, 112 thereof and tightly inserting permanent magnets 110, 110 respectively between the two ends 114, 114 of the opposing pair, in which case the exciting coils 113, 113 are wrapped in the same direction as the closed magnetic circuit, and the current with which the exciting coils 113, 113 are impressed is connected in such a way as to form a magnetic field with a direction opposite to that of the magnetic fields of permanent magnets 110, 110.

Number 107 indicates a collar consisting of aluminum or other nonmagnetic material inserted and fixed on the outside of the above-mentioned rotating axis 104. A number of (9 in the figure) attracted blocks 108 (108*a*, 108*b*, 108*c*, etc.) made of soft iron or other magnetic material are arranged and fixed, at equal angles and intervals in the circumferential direction, to the surface of the outer perimeter of the cylindrical support 107*a* of that collar 107, constituting an inner-perimeter rotor 115 close to the inside perimeter of the attraction magnetic field generating mechanisms 101 of the above-mentioned stator 105 during rotation of the rotating axis 104.

Number 116 indicates a rotating plate consisting of aluminum or other nonmagnetic material that is inserted and fixed on the outside of the above-mentioned rotating axis 4. An outer-perimeter rotor 117 that undergoes rotational displacement near to the outer perimeter of the attraction magnetic field generating mechanisms 101 of the above-mentioned stator 5 during rotation of the rotating axis 104 is constituted by arranging and fixing a number of (9 in the figure) attracted blocks 109 (109*a*, 109*b*, 109*c*, etc.) made of soft iron or other magnetic material on the side of outer perimeter edge 116*a* of the said rotating plate 116 at equal angles and intervals in the circumferential direction.

In the attraction magnetic field generation mechanisms 101 of the above-mentioned rotary motor, when the two exciting coils 113, 113 are impressed with current in such a way that poles identical to the permanent magnets 110, 110 appear at opposing ends 114, 114 of yokes 111, 111, magnetic fields representing the total together with the flux density in the poles of the permanent magnets 110, 110 occur at the said ends opposing attracted block 108 of inner-perimeter rotor 115 or attracted block 109 of outer-perimeter rotor 117 ("ON" state), and attracted blocks 108, 109 of inner-perimeter rotor 115 and outer-perimeter rotor 117 corresponding to the attraction magnetic field generating mechanism 1 in the "ON" state are strongly attracted.

Moreover, if the current with which exciting coils 113, 113 of yokes 111, 111 have been impressed is cut off, the magnetic circuit including the two permanent magnets 110, 110 is closed, the magnetic field that occurred between ends 114, 114 of the two yokes 111, 111 is lost and the attraction force on attracted blocks 108, 109 is cancelled ("OFF" state).

Attracted block 108 of inner-perimeter rotor 115 and attracted block 109 of outer-perimeter rotor 117 are selectively attracted according to whether the magnetic force occurs or is lost depending on the "ON" or "OFF" state of the above-mentioned attraction magnetic field generating mechanism 101 and undergo rotational displacement, turning rotating axis 104 and obtaining rotational output.

Figure 14:
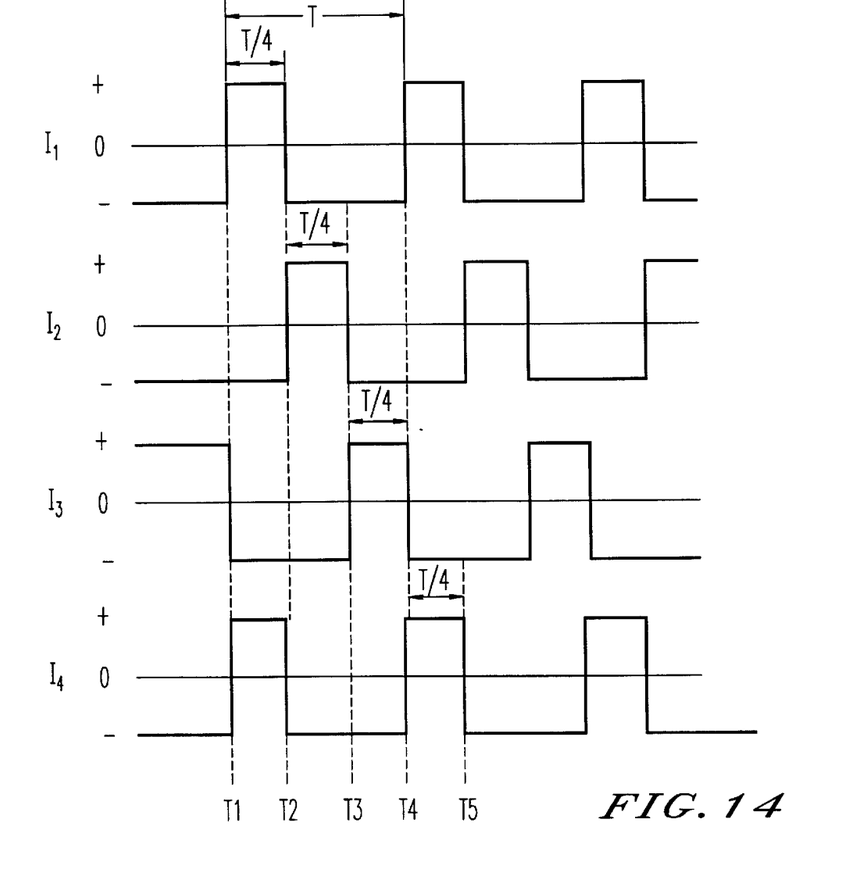
FIG. 14 is the timing chart of the current with which the same attraction magnetic field generating mechanism is impressed.

The rotary motor with the above configuration shows an embodiment of the structure in which 12 attraction magnetic field generating mechanisms 101 are arranged and fixed in the circumferential direction of stator 105 and 9 attracted blocks 108, 109 are arranged in the circumferential direction of inner-perimeter rotor 115 and outer-perimeter rotor 117. The attraction magnetic field generating mechanisms 101 impress the 12 pairs of exciting coils 113, 113 in four sets (3 pairs or 6 coils in each set) with current, each pair with a ¼ cycle phase lag, to actuate yokes 111, 111 (see FIG. 14), selectively attracting attracted blocks 108, 109 successively in the direction of rotation and causing them to undergo rotational displacement, thus obtaining rotary output from rotating axis 104.

[Embodiment 5]

Figure 15:
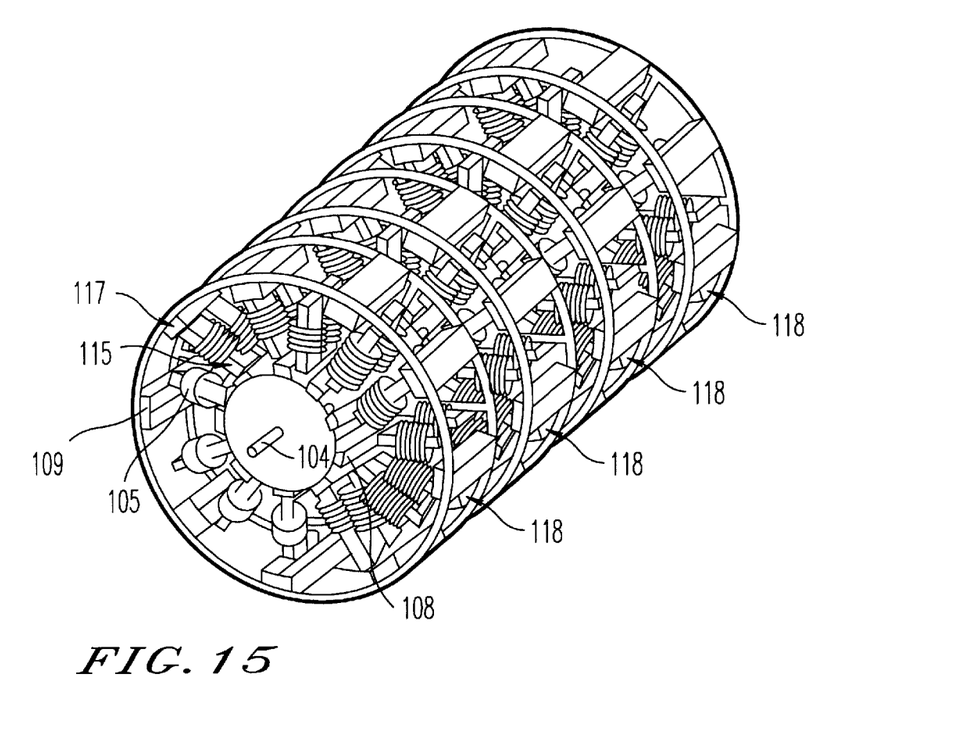
FIG. 15 is a diagonal view of a rotary motor as the second embodiment of an energy conversion device using permanent magnets as per the present invention.

FIG. 15 shows a parallel configuration in the axial direction of rotating axis 4 of a number of (4 in the figure) the rotary magnetic field generating structures 118 consisting of a combination of stator 105 with inner-perimeter rotor 115 and outer-perimeter rotor 117 of the rotary motor explained in the above-mentioned form of embodiment of the invention.

In FIG. 15 the attraction magnetic field generating mechanisms 101 of the stators 105, attracted blocks 108 of inner-perimeter rotors 115 and attracted blocks 109 of outer-perimeter rotors 117 of all of the rotary magnetic field generating structures 118, 118, etc. are installed at the same angle and position, but it is also possible to stagger the installation positions of the rotary magnetic field generating structures 118, 118, etc. in the axial direction and have a structure in which adjacent ones have different phases.

[Embodiment 6]

Figure 16:
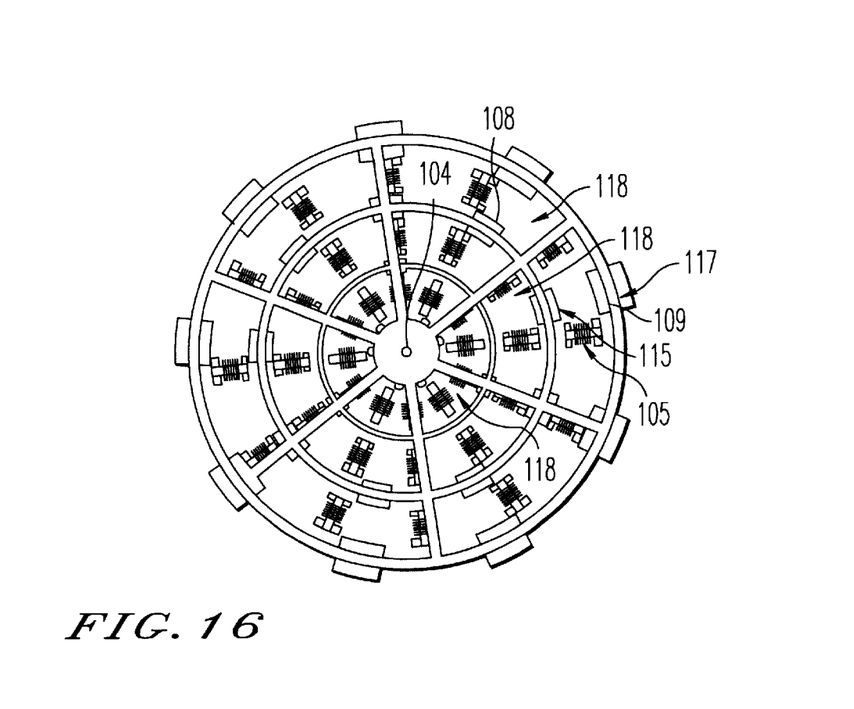
FIG. 16 is a diagonal view of a rotary motor as the third embodiment of an energy conversion device using permanent magnets as per the present invention.

FIG. 16 shows a stack configuration in the radial direction of rotating axis 104 of a number of (3 in the figure) the rotary magnetic field generating structures 118 consisting of a combination of stator 105 with inner-perimeter rotor 115 and outer-perimeter rotor 117 of the rotary motor explained in the above-mentioned form of embodiment of the invention. It is a configuration in which there is partial sharing of structure (support structure) between outer-perimeter rotor 117 of the inside rotational force generating device 118 and inner-perimeter rotor 115 of outside rotational force generating device 118.

In FIG. 16 the attraction magnetic field generating mechanisms 101 of the stators 105, attracted blocks 108 of inner-perimeter rotors 115 and attracted blocks 109 of outer-perimeter rotors 117 of all of the rotary magnetic field generating structures 118, 118, etc. are installed at the same angle and position, but it is also possible to stagger the installation positions of the rotary magnetic field generating structures 118, 118, etc. in the axial direction and have a structure in which adjacent ones have different phases.

[Embodiment 7]

Figure 17:
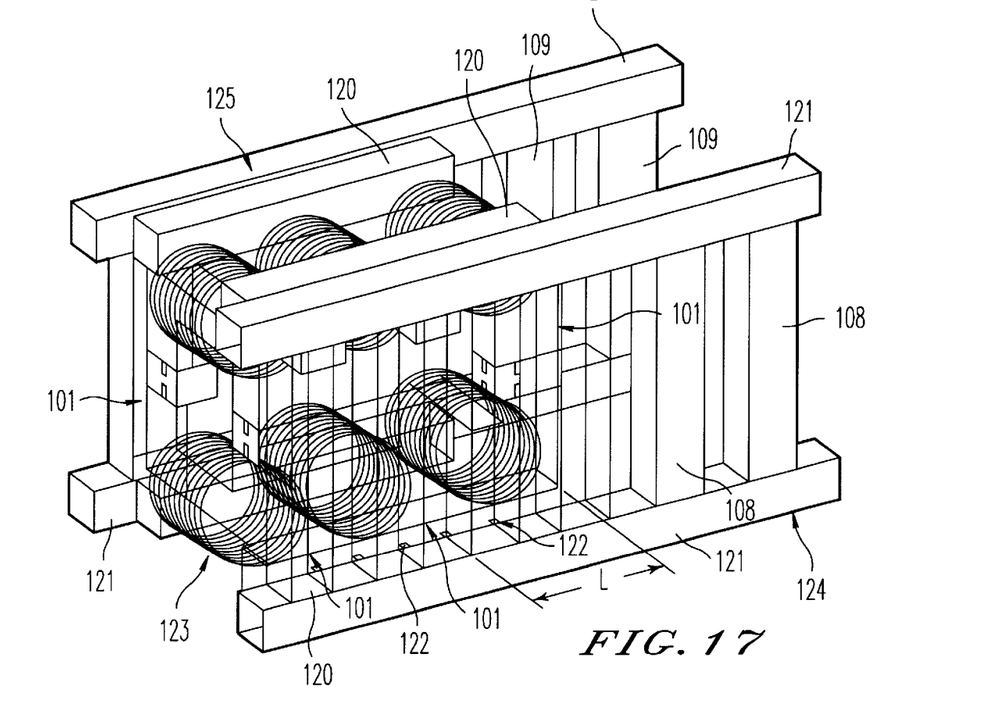
FIG. 17 is a diagonal view of a linear motor as the fourth embodiment of an energy conversion device using permanent magnets as per the present invention.
Figure 18:
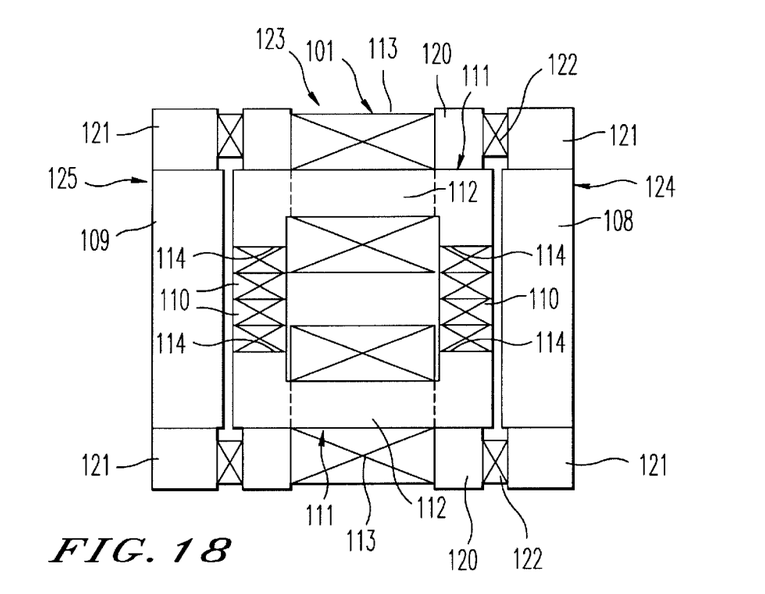
FIG. 18 is a frontal view of the same.

FIG. 17 and FIG. 18 show embodiment of the principle of the present invention as a linear magnetic field generating structure in a linear motor application.

The structure of the attraction magnetic field generating mechanisms 101 (101a, 10b, 10c, etc.) is the same as in above-mentioned form of embodiment of the invention. There are opposing yokes 111, 111 with a bracket shape and consisting of a pile of plates of permalloy or other soft magnetic material, and a closed magnetic circuit with magnetic fields of the same direction is formed by wrapping exciting coils 113, 113 respectively around the columnar parts 112, 112 thereof and tightly inserting permanent magnets 110, 110 respectively between the two ends 114, 114 of the opposing pair, in which case the exciting coils 113, 113 are wrapped in the same direction as the closed magnetic circuit, and the current with which the exciting coils 113, 113 are impressed is connected in such a way as to form a magnetic field with a direction opposite to that of the magnetic fields of permanent magnets 110, 110.

The above-mentioned attraction magnetic field generating mechanisms 101 (101a, 101b, 10c, etc.) are fixed in hanging fashion at equal intervals (L) between frames 120, 120 consisting of aluminum or other nonmagnetic material. Those frames 120, 120 are hung and supported on two pairs of support rails 121, 121, one upper and the other lower, and move freely in sliding manner in the rail direction on thrust or other bearings 122, 122, etc., thereby constituting moving element 123.

Furthermore, The above-mentioned support rails 121, 121, etc. are made of aluminum or other nonmagnetic material. Between the upper pair and lower pair of support rails 121, 121 are respectively hung attracted blocks 108 (108a, 108b, 108c, etc.), 109 (109a, 109b, 109c, etc.) made of soft iron or other magnetic material at intervals equal to ⅔ of the installation interval L of the attraction magnetic field generating mechanisms 101 and in such a way as to be near the permanent magnets 110, 110 of the attraction magnetic field generating mechanism 1, thereby constituting upper fixed element 124 and lower fixed element 125.

In the linear motor with the above-mentioned configuration the exciting coils 113, 113 of the attraction magnetic field generating mechanisms 101 are impressed with current with ⅓ cycle phase lag for each pair so as to actuate yokes 111, 111 to "ON", attracted blocks 108, 109 are selectively attracted in succession in one direction and undergo displacement, imparting propulsion output to moving element 123.

It should be noted that although FIG. 17 and FIG. 18 indicate a structure in which the attraction magnetic field generating mechanisms 101 are arranged in one row in the direction of support rail 121, it goes without saying that it is also possible to have a structure in which they are stacked longitudinally or transversely.

In the above the most preferred embodiments of the present invention have been explained in some detail. Considering, however, the evident fact that it is possible to construct a wide range of other forms of embodiment thereof without departing from the thinking or scope of the invention, the present invention is not restricted to those particular forms of embodiment other than in terms of the limitations set by the annexed claims.

What is claimed:

1. An energy conversion device comprising:

a magnetic field generating device including a bracket-shaped made of magnetic material having a bottom portion and two columnar sections, each of said two columnar sections extending up from said bottom portion and each of said columnar sections having an upper portion extending from the top of the respective columnar section, and a plurality of permanent magnets disposed between the upper portions to form a top portion of said yoke and also to provide a closed magnetic circuit wherein said permanent magnets are arranged in a row; and a plurality of blocks having a length parallel to the row formed by said permanent magnets, said blocks forming a supporting structure in an equally spaced arrangement opposite the top portion of the yoke such that a direct current applied to said magnetic field generating device attracts or repels said blocks to cause movement of said blocks in a direction parallel to said row formed by said permanent magnets.

2. A linear motor comprising:

a plurality of magnetic field generating devices equally spaced and arranged in a straight line, each of said devices including:

a bracket-shaped made of magnetic material having a bottom portion and two columnar sections, each of said two columnar sections extending up from said bottom portion and each of said columnar sections having an upper portion extending from the top of the respective columnar section, and a plurality of permanent magnets disposed between the upper portions to form a top portion of said yoke and also to provide a closed magnetic circuit wherein said permanent magnets are arranged in a row; and a moving body including a plurality of blocks arranged in a straight line opposite said line of magnetic field generating devices, said moving bodies supported by a supporting structure such that said moving body will undergo linear displacement in a direction of said straight line upon application of staggered-phased control currents to said magnetic field generating devices.

3. A rotary motor comprising:

a plurality of magnetic field generating devices equally spaced and arranged in a circle thereby defining a cylindrical space, each of said devices including:

a bracket-shaped made of magnetic material having a bottom portion and two columnar sections, each of said two columnar sections extending up from said bottom portion and each of said columnar sections having an upper portion extending from the top of the respective columnar section, and a plurality of permanent magnets disposed between the upper portions to form a top portion of said yoke and also to provide a closed magnetic circuit wherein said permanent magnets are arranged in a row; and an inner rotatable body positioned inside said cylindrical space and having a perimeter with a plurality of blocks arranged on the perimeter of said body, said body freely rotatable in said cylindrical space about an axis of said cylindrical space such that such body rotates in a desired direction upon application of staggered-phase control currents to said magnetic field generating devices.

4. An energy conversion device comprising:

an attraction magnetic field generating device including first and second bracket shaped magnetic yokes made of magnetic material, each yoke having a columnar section and two ends perpendicular to said columnar section, the two ends of said first yoke opposed to the two ends of said second yoke thereby defining two gaps with an exciting coil wrapped around each columnar section and a first and second plurality of permanent magnetics being respectively inserted into each of said two gaps thereby forming a closed magnetic circuit, said first and second plurality of permanent magnets each being arranged in a row in each of said gaps; and a first and second plurality of blocks each having a length parallel to the rows formed by said permanent magnets and each of said blocks supported by common supporting structure and wherein said first plurality of blocks is opposite said first plurality of permanent magnets and said second plurality of blocks is opposite said second plurality of permanent magnets such that a direct current applied to said magnetic field generating devices attracts or repels said blocks.

5. A rotary motor comprising:

a plurality of magnetic field generating devices arranged in a circle thereby defining a cylindrical space wherein said generating devices are fixed to a supporting structure with an inner rotor being located within said cylindrical space and an outer rotor surrounding said cylindrical space;

said inner rotor having an outer perimeter with a first plurality of blocks equally spaced along the outer perimeter, said first plurality of blocks being positioned so that one main surface of each of said first plurality of blocks faces said plurality of field generating devices;

said outer rotor having an inner perimeter with a second plurality of blocks equally spaced along the inner perimeter wherein said second plurality of blocks each have one main surface positioned opposite said plurality of field generating devices;

said inner and outer rotors each connected to a rotating axis which is coaxial with the center of said rotors and said cylindrical space such that staggered-phase control currents applied to said magnetic field generating devices selectively accelerate said inner and outer rotors to thereby generate rotational movement of said axis.

6. A rotary motor according to claim 5, wherein each of said magnetic field generating devices comprises:

first and second bracket shaped magnetic yokes made of magnetic material, each yoke having a columnar section and two ends perpendicular to said columnar section, the two ends of said first yoke opposed to the two ends of said second yoke thereby defining two gaps;

an exciting coil wrapped around each said columnar section; and a plurality of permanent magnets inserted into each of said two gaps forming a closed magnetic circuit, said permanent magnets arranged in a row in each said gap.

7. A rotary motor according to claim 6, wherein each of said magnetically attracted blocks has a length parallel to the row formed by said permanent magnets.

8. A linear motor comprising:

a plurality of magnetic field generating devices having first and second sides and arranged in a straight line, said devices supported by a supporting frame wherein said devices and said frame form a moving body; and first and second rows of equally spaced blocks, each of said first and second rows being supported by a supporting structure and each row parallel to said moving body, said first and second row each are respectively formed opposite said first and second side of said magnetic field generating devices such that staggered-phase control currents applied to said magnetic field generating devices selectively attract said first and second row of said blocks causing linear motion of said moving body.

9. A linear motor according to claim 8, wherein each of said magnetic field generating devices comprises:

first and second bracket shaped magnetic yokes made of magnetic material, each yoke having a columnar section and two ends perpendicular to said columnar section, the two ends of said first yoke opposed to the two ends of said second yoke thereby defining two gaps;

an exciting coil wrapped around each said columnar section; and a plurality of permanent magnets inserted into each of said two gaps forming a closed magnetic circuit, said permanent magnets arranged in a row in each said gap.

10. A linear motor according to claim 9, wherein each of said magnetically attracted blocks has a length parallel to the row formed by said permanent magnets.

* * * * *